Aug. 17, 1954     A. M. PETERSON     2,686,381

FISH LURE

Filed June 7, 1952

INVENTOR.
ALDON M. PETERSON

BY H. F. Woodward
atty.

Patented Aug. 17, 1954

2,686,381

UNITED STATES PATENT OFFICE 2,686,381

FISH LURE

Aldon M. Peterson, Wayzata, Minn.

Application June 7, 1952, Serial No. 292,251

4 Claims. (Cl. 43—42.09)

This invention relates to fish lures.

An object of this invention is to provide novel means whereby a single bait-hook mounting ring may be readily detachably secured to a number of structurally similar lures. This novel arrangement of parts makes it possible to place a large number of bait bodies of different sizes, shapes and color in a bait box or the like in close proximity to each other without fear of having the hook elements become entangled.

A still further object of the invention is the provision of means to enable the lure body being changed without the changing of the bait hook.

With the above and other objects of this invention in view, the invention consists in the arrangement, combination and details of construction disclosed in the drawing and specification, and then more particularly pointed out in the appended claims.

For the purpose of this application, there has been elected to set forth two particular structures but it is to be understood that they are here presented for illustrative purposes only and are not to be accorded any interpretation such as might have the effect of limiting what is claimed as the invention short of its true and comprehensive scope in the art.

Figure 1:
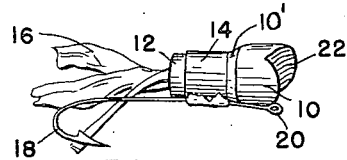
Figure 1 is side elevational view of the new bait.
Figure 2:
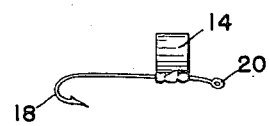
Figure 2 is view of the hook and supporting ring or band.

Referring now in detail to the drawing by the use of reference characters, 10 designates the head portion of the body and 12 designates the reduced tail portion of the lure body. The portion 12 is tapered from the enlarged head 10 toward the free end. The body may be made of any suitable material and colored in any desired hue. As it is well known, red, yellow, or green lure bodies may perform better at one time while other colored lure bodies may perform better at other times.

Secured in an opening 30 by a suitable water resistant adhesive are feathers or other material 16 normally employed in connection with lures. The feathers generally are of a different color than the lure body.

Removably secured on lure body portion 12 is a ring or ferrule 14, to which is secured a hook member 18 which is provided with a line attaching eye. The hook member may be removably secured to the ring 14 or it may be permanently connected thereto. The eye 20 of the hook 18 should not extend substantially beyond the V-shaped forward end 22 of the lure body.

Figure 3:
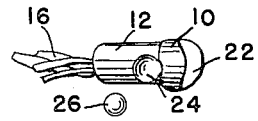
Figure 3 is a view of the bait body with hook supporting band removed.

As shown in Figure 3, if it is desired to increase the weight of the lure, a weight such as ball 26 is placed in opening 24 of the lure body. The ring 14, when in place, covers the ball 26 and holds it in position.

Figure 6:
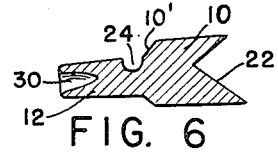
Figure 6 is a sectional view of the bait body of the kind shown in Figure 3.

Figure 6 shows a section through the lure body and shows the opening 30 tapered. A suitable water resistant adhesive is placed in the opening and the feathers are then forced into the adhesive.

Figure 4:
Figure 4 is a view of a resilient bait body.
Figure 5:
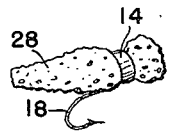
Figure 5 is a view of the bait body shown in Figure 4 with hook supporting band in place.
Figure 7:
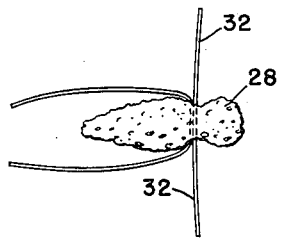
Figure 7 is a sectional view through a resilient bait body.

The lure body 28 shown in Figures 4, 5 and 7 is formed of flexible elastic material such as sponge rubber. A ring or band 14 of suitable size is used in combination with the body portion 28. It is to be understood that the ring 14 is removably secured on the body portion. If it is desired to cause the lure 28 to sink, then one or more shots or balls 26 are inserted under the ring 14. Generally it is desirable to insert or pass through the body portion members 32, which are preferably elongated flexible elastic strands.

The enlarged head portion 10 of the body has extending therefrom the tapered tail portion 12 the rearward portion of the head abruptly sloping to the tail portion thereby forming a shoulder portion 10' as shown in Figures 1 and 6 of the drawings. The band or ring 14 is of a diameter substantially the same but slightly larger than the largest diameter of the tapered tail portion so that there is a frictional grip between the band 14 and the largest diameter of the tapered tail portion. The weight-receiving opening is positioned in the tapered tail portion and is covered by the band when the latter is in frictional engagement with the tapered tail portion and in abutting relationship with the shoulder of the head portion.

What I claim is:

1. A fish lure comprising a body portion having a head and a tapered tail portion, the head sloping to the tail portion forming a shoulder and the tail portion tapering away from the head, said tail portion having a weight receiving opening adjacent the head, a ring slideably mounted on the tail portion and of a diameter to provide frictional engagement with the largest portion of the tail portion and of sufficient width to constitute a closure for the opening and a hook secured to the ring, said shoulder constituting a stop to position the closure directly over the opening.

2. A fish lure comprising a body having a head portion and a tail portion, the latter being tapered and of reduced cross section relative to the head portion and substantially circular in cross section, and a hook having a shank provided with an eye at one end thereof, said hook having a ring secured thereto, said head having a shoulder at one end thereof, said ring being at such a distance from said eye that when the ring is in position on the tail portion in engagement with the shoulder the eye will be positioned adjacent the forward edge of the head portion, said ring frictionally retaining the hook in assembled relation on the tail portion, said tail portion having a weight receiving opening therein, said ring constituting a closure for said opening.

3. A fish lure comprising a body portion having a head and a tapered tail portion, the head sloping from the tail portion forming a shoulder, the tail portion tapering away from the head, said tail portion having a weight receiving opening adjacent the head, a ring slideably mounted on the tail portion and of a diameter to provide frictional engagement with the largest portion of the tail portion and of sufficient width to constitute a closure for the opening, a hook secured to the ring, said shoulder constituting a stop to position the closure directly over the opening, and feather-like members secured in the end of the tail portion.

4. A fish lure comprising a body having a head portion and a tail portion, the latter being tapered and of reduced cross section relative to the head portion and substantially circular in cross section, and a hook having a shank provided with an eye at one end thereof, said hook having a ring secured thereto, said head having a shoulder at one end thereof, said ring being at such a distance from said eye that when the ring is in position on the tail portion in engagement with the shoulder the eye will be positioned adjacent the forward edge of the head portion, said ring frictionally retaining the hook in assembled relation on the tail portion, said tail portion having a weight receiving opening therein, said ring constituting a closure for said opening, said head portion having a substantially V-shaped face.

References Cited in the file of this patent

UNITED STATES PATENTS

| Number | Name | Date |
| --- | --- | --- |
| 764,171 | Bingenheimer | July 5, 1904 |
| 1,336,227 | Hayes | Apr. 6, 1920 |
| 1,435,177 | Peckinpaugh | Nov. 4, 1922 |
| 1,776,090 | Shroyer | Sept. 16, 1930 |
| 1,858,550 | Kahle | May 17, 1932 |
| 1,905,567 | Pflueger | Apr. 25, 1933 |
| 2,010,976 | Cataru | Aug. 13, 1935 |
| 2,268,541 | Arbogast | Jan. 6, 1942 |
| 2,522,073 | Trada | Sept. 12, 1950 |
| 2,573,018 | Herrick | Oct. 30, 1951 |
| 2,573,399 | Cannon | Oct. 30, 1951 |
| 2,620,587 | Green | Dec. 9, 1952 |